June 15, 1965  H. P. RAABE  3,189,900
AIRBORNE RADAR WITH SEA CLUTTER SUPPRESSION
Filed Sept. 18, 1959  3 Sheets-Sheet 1

INVENTOR.
HERBERT P. RAABE
BY
Stuart R. Peterson
ATTORNEY

3,189,900
AIRBORNE RADAR WITH SEA CLUTTER SUPPRESSION

Herbert P. Raabe, North Oak, St. Paul, Minn., assignor, by mesne assignments, to Litton Systems, Inc., Beverly Hills, Calif., a corporation of Maryland
Filed Sept. 18, 1959, Ser. No. 841,661
6 Claims. (Cl. 343—16)

This invention relates generally to radar and pertains more particularly to an airborne radar system in which sea clutter, and under certain conditions also land clutter, is suppressed. In other words, the present invention is concerned with the general aspects of suppressing clutter return from the earth's surface.

The suppression of sea clutter has been the major and still unsolved problem of airborne early warning (AEW) studies. Although a variety of physical differences exist between the return from the sea and that of targets, these differences are not always sufficient so as to draw a practical boundary line between what is desired from the target and what is received from the sea. Consequently effective reduction of the clutter has heretofore been made at the expense of some target loss. However, even the loss of some targets, or the uncertainty as to whether a target will be detected is enough to make an AEW radar system unreliable, especially where relatively small, low flying targets may be within close range.

Due to the fact that sea clutter creates an interference pattern on the indicators of the AEW radar, the degree of interference being according to the state of disturbance of the sea, aircraft carrying out certain AEW operations have been forced to choose between operating at an altitude of approximately 15,000 feet (with the 150 nautical mile radar range that this altitude provides), and an altitude of 5,000 feet with the reduced (only 87 nautical miles) radar range that this flight altitude provides. This lower altitude reduces sea clutter since the grazing angle is lower. High sea states, and consequently increased sea clutter, occupy a major portion of the area covered by the AEW system.

It might be explained at this time that most efforts during past years have been directed towards the spectral discrimination between targets and sea clutter. However, to my knowledge no effort has made use of the difference in height between all airborne targets and the sea surface. This latter use is the principle upon which the instant invention is based.

Accordingly, the primary object of this invention is to provide a sea clutter suppression system that will effectively discriminate between sea clutter and airborne targets in a manner such that any airborne target will be clearly discernible on the radar indicator. As a result, the aircraft carrying radar equipped with my clutter trap can operate at higher altitudes without experiencing the reception of an increased amount of sea clutter. In this way, fewer aircraft need be employed in covering a given sea area. As already briefly mentioned, the contemplated system will at times find utility over certain types of terrain, namely that which is relatively flat or non-mountainous.

More specifically, the invention involves directing a null or notch in the receiving antenna characteristic or pattern toward the sea at the range which is at that particular instant being displayed or "painted" on the indicator. What the notch does is to permit the antenna to see the difference in the reflected energy via two paths or beams. If one beam is positioned into a slightly different direction, different signals will be received from objects except for an object which is in a position intermediate the axes of the two beams where the relative gains of the beams are the same. In other words, the unwanted sea clutter is effectively removed, leaving only the signal from the target displayed, which is of course what is desired.

A further feature of the invention is to move the notch referred to in the preceding paragraph through an elevational angle, thereby producing a rapid range sweep. No physical tilting of the antenna is necessary as it is within the contemplation of the invention to achieve this electronically or electromagnetically. Consequently only an azimuth rotation of the antenna is necessary.

Yet another object of the invention is to provide a sea clutter trap of the foregoing character that will add little weight and cost to conventional radar equipment, thereby encouraging the extensive adoption of my invention for the purpose herein envisaged.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
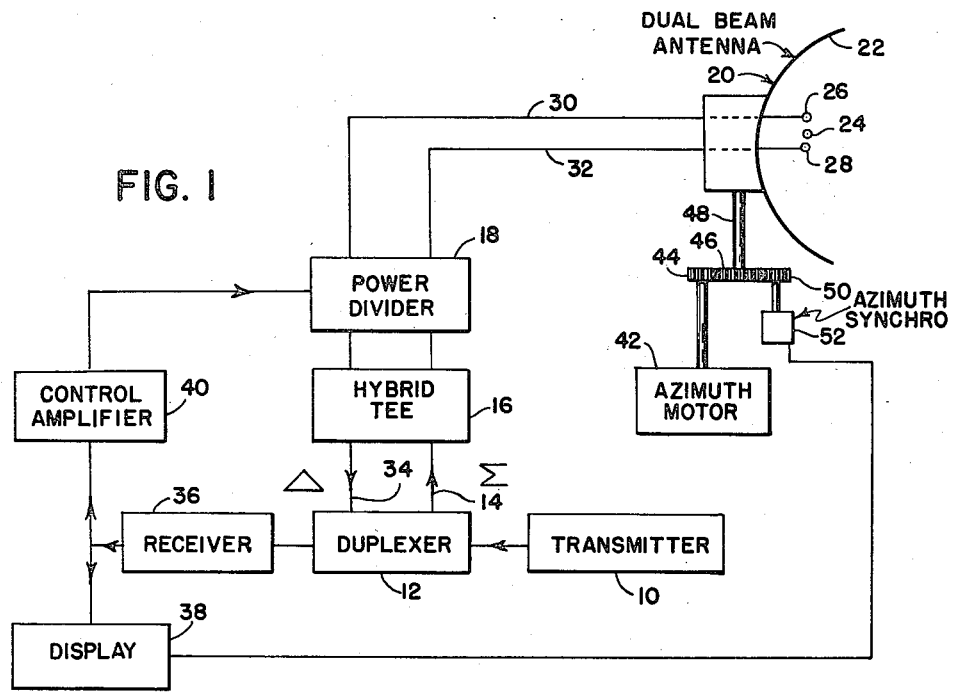
FIGURE 1 is a block diagram illustrating a simplified version of my sea clutter suppression system for carrying out airborne operations.

Referring now to the block diagram constituting FIG. 1, there is a transmitter 10 for generating electromagnetic radar pulses which are fed through a duplexer 12. Each transmitted pulse passing through this duplexer 12 continues over a sum (Σ) channel 14 provided by a hybrid T junction 16 to a ferrite type power divider 18. The system employs an antenna designated generally by the reference numeral 20. Included as part of the antenna 20 is a parabolic reflector 22 having its focal point at 24 and a pair of radiators 26 and 28, one radiator being disposed just above the focal point 24 and the other just below said point. The radiators 26, 28 are connected to the power divider 18 via feeder lines 30 and 32, respectively.

By reason of the above-described mounting of the radiators 26 and 28, the upper radiator 26 when energized provides a beam pointed slightly down, whereas the lower radiator 28 radiates a similar beam pointed slightly up with respect to the axis of the antenna. The two pencil-like beams constituting the response or reflected energy include overlapping portions in the general direction of the echoing patch on the surface of the sea. A more detailed explanation will be given presently concerning the transmitting and receiving characteristics achieved with these radiators 26, 28.

Figure 2:
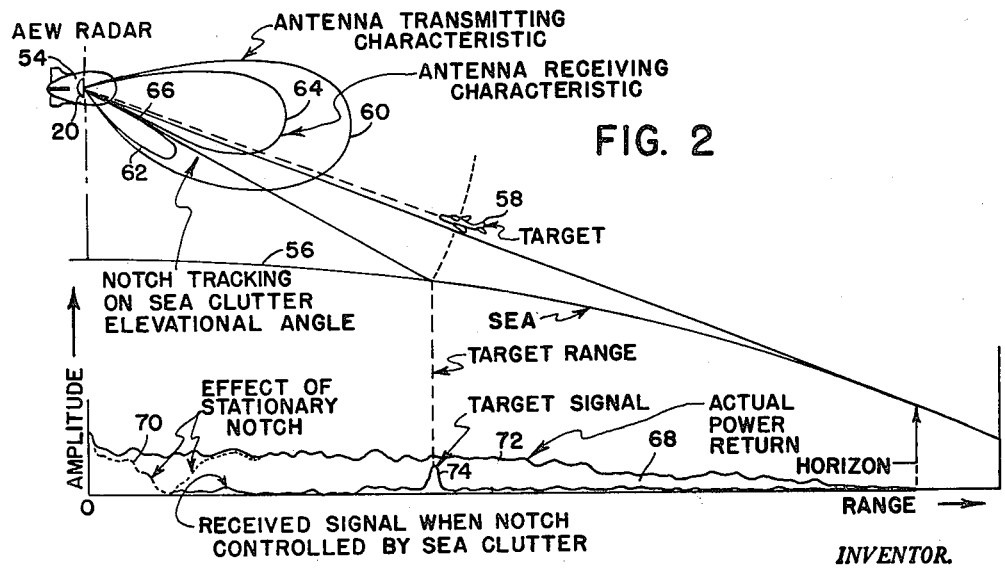
FIG. 2 is a combined schematic and graphical view illustrating a given position of a radar-carrying aircraft and an airborne target in relation thereto and to the sea, the view having superimposed thereon typical transmitting and receiving characteristics to aid in the understanding of the principles underlying the invention.

Describing now the manner in which the electromagnetic energy reflected back to the antenna 20 is handled, it will be understood, of course, that this received energy will be fed to the power divider 18 via the feeder lines 30 and 32. For the moment it will be assumed that the received power passes through the power divider 18 to the hybrid T junction 16 without any relative attenuation. The hybrid T junction is connected so as to cause the difference (Δ) channel 34 to transfer energy to the duplexer 12 that is due only to the difference between the amount of energy received by the radiator 26 and that received by the radiator 28. If there is only a small signal entering the duplexer from the T 16 due to a strong radar scatterer, the antenna must be positioned or directed toward the scatterer. With proper adjustment of the antenna elevation angle, this scatterer can be represented by a sea clutter patch. On the other hand, if there is a sizeable difference, then one of the radiators is receiving more energy due to energy being reflected from an intervening elevated target. FIG. 2 will be helpful in providing a better understanding of what occurs in this respect. However, specific reference to FIG. 2 is better reserved for discussion after a complete description has been given of the block diagram constituting FIG. 1.

A conventional receiver 36 is connected to the duplexer 12, whereby the receiver receives any signal that may be present due to there being a difference in the energy components forwarded from the difference channel 34. Consequently, the receiver 36 produces an output signal based only on there being a detectable difference in the strength of the signals received by the radiators 26, 28. Any such signal signifies the presence of a target, so is delivered in the form of video pulses from the receiver to the customary display or indicator labelled 38. Since the video signals impressed on the indicator contain practically no components due to sea clutter, these components having been in effect balanced out, there can be no discernible sea clutter displayed on the indicator 38.

At this time it can be explained that the power divider 18 does not divide the energy it handles equally, nor does it do so on a proportional basis. Instead, it does so in a controlled fashion for a reason now to be clarified. In this regard, what is desired is that the notch appearing in the antenna receiving characteristic be moved through an elevation angle so that a fast range sweep is produced. The desired notch movement is achieved by a progressive unbalancing of the energy signals passing through the power divider 18 on their way to the hybrid T junction 16. In the present situation the divider 18 may be considered to be equipped with a ferrite device in one of its guide lines, more specifically, the one associated with the upper radiator 26. Such a device in the instant case would include a magnetizing coil encircling the ferrite core. The degree of attenuation afforded by the ferrite device is therefore dependent upon the degree of energization of its coil. For the purpose of energizing the ferrite device and thereby influencing its attenuating role, a control amplifier is connected to the output side of the receiver 36. Thus, any signal fed to the amplifier 40 will be amplified and this amplified signal is impressed on the magnetizing coil of the ferrite device. The greater the signal, the less will be the amount of attenuation in this particular situation because of the specific location of the ferrite device.

Although sufficient background information still has not been given for a full appreciation of how the range sweep is accomplished, it will undoubtedly be of considerable help at this time to state that while it is within the purview of the invention to nullify signals due to sea clutter in the difference channel 34, in practice there will not be a complete balancing out, even when there is no target. It is this residual energy, resulting in a small output signal from the receiver 36, that is impressed on the control amplifier 40. Even though initially small, such a signal when amplified balances the constituent signals in the power divider 18 and this balance immediately appears in the difference channel 34 to decrease the magnitude of the receiver signal. It is this continual feed-back that causes a progressive balancing. Thus, even though the beam energy initially reflected from the sea to the radiators 26, 28 is substantially equal, the slight difference actually present is sensed by the amplifier. Therefore, if the geometrical axis of the antenna is pointed toward the horizon, the notch can initially be made to point down through a controlled suppression of the lower beam by means of a bias voltage superimposed on the control voltage between the control amplifier 40 and the power divider 18. When there is a buildup of the energization applied to the ferrite device, and this buildup will be progressive owing to the feed-back produced by the amplifier 40, the attenuation will decrease as far as the power coming in over the line 30 is concerned, for the ferrite device affects this path. Because of this, the receiving characteristic for the radiator 26 will become stronger and stronger. Relatively speaking, the receiving characteristic becomes more predominant with the consequence that the notch moves upwardly, thereby producing a range sweep from a source nearly under the antenna 20 to the horizon. When the horizon is reached, then there is no sea clutter received by either radiator 26 or 28. Hence, the bias applied to the power divider 18 will automatically return the notch to its starting position, which is of course at a short range.

Although the range sweep is effected without moving the antenna 20, as preliminarily dealt with above, the azimuth scanning is accomplished by rotating the antenna about a vertical axis in the same manner that azimuth scanning has heretofore been done. Therefore to complete the description of FIG. 1, an azimuth driving motor 42 has been shown having attached thereto a pinion 44 enmeshed with a gear 46 at the lower end of a rotatable vertical shaft 48. Through the medium of a take-off gear 50 and azimuth synchro 52, a proper antenna-position signal is continuously forwarded to the display or indicator 38.

Having presented the foregoing information, it is believed that an explanation of FIG. 2 will provide a complete understanding as to how the illustrated system functions. In FIG. 2 an airborne balloon or blimp 54 has been depicted as the carrier for the antenna 20, although an elevated platform will suffice. The portion of the seascape below the balloon 54 has been denoted by an arc 56. Also, a target in the form of a low flying plane 58 has also been included in the pictorial portion of this figure.

As depicted, the antenna transmitting characteristic has been indicated by the reference numeral 60. The antenna receiving characteristic consists of two lobes 62 and 64 which result from the subtraction of the signals received by the two beams generated by the upper and lower radiators 26 and 28. It can be explained that a notch 66 will always appear at the point where the contributing beams intersect. If there is no control signal, as would be the case if the control amplifier 40 were not employed, then, of course, the notch 66 would remain stationary as far as the elevation angle is concerned, although it would sweep in azimuth due to the rotation of the antenna 20 about its vertical axis provided by the shaft 48 and the motor 42 which rotates this shaft.

However, the notch does not remain stationary but is moved by reason of the control amplifier 40 and the power divider 18. What happens is that the notch 66 is initially pointed down for a short range display on the indicator 38 and will move upwardly in the aforesaid manner. This is so because with no target, such as the plane 58, present, the two beams would be receiving an increasing difference in the amount of reflected energy from the sea. However, progressive decrease of the attenuation of the energy contained in the beam associated with the lobes 64 will move the notch toward the beam that is becoming progressively weaker because relatively speaking, the beam associated with the lobe 62 is becoming more predominant.

However, when the lobe 64 is of the proportions depicted in FIG. 2, owing to the fact that it represents additional energy which is being reflected from the plane 58, it will be appreciated that there is a pronounced difference in energy contained in the two received beams. The difference channel 34 thus feeds considerable energy to the receiver 36 via the duplexer 12. This in turn generates video pulses of sufficient magnitude so as to be displayed on the indicator 38.

Undoubtedly, the lower or graphical portion of FIG. 2 will greatly assist in affording a more complete understanding of the principles involved and answers as to why the instant system surpasses conventional radar systems in the presenting of clutterless displays. In the alluded-to section of FIG. 2, the magnitude or amplitude of the received energy or power has been plotted against range. The actual power return has been denoted by the numeral 68, being pretty much what an ordinary radar set would receive and display: heavy clutter at lower ranges, which covers up the target return, and clutter tapering gradually downward towards the radar horizon. While the notch 66 in the upper portion of FIG. 2 is shown directed at a spot on the sea just below a projection of the target 58, it will be assumed for a moment that the notch 66 has been shifted downwardly so that it is pointing at a spot almost directly under the aircraft 58, which position will be referred to as the "rest" position. The reason for this is to avoid an interference between curves, the effect of the notch 66 under these circumstances being indicated by the dotted curve 70 superimposed on the curve 68. The curve 70 vividly demonstrates the role played by the notch 66 in the virtual elimination of sea clutter. However, as hereinbefore mentioned, a rather weak signal does remain and a typical signal has been designated by the numeral 72, the target signal rising perceptively from the signal as indicated at 74. At this stage of the description, it can be appreciated that the curve 72 does taper to zero at the horizon. Nonetheless until it reaches the horizon there is a signal of sufficient strength to be passed to the amplifier, affording the feed-back voltage signal previously mentioned.

Figure 3:
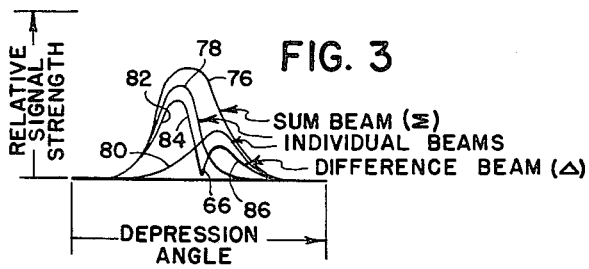
FIG. 3 is a graphical representation of certain beam characteristics of the system of FIG. 1.

While it is believed that an adequate background has now been given for understanding the invention, nonetheless FIG. 3 might be of further help. This figure shows a group of gain curves plotted against elevation angle. The curve 76 is representative of the energy passing through the sum channel 14. The individual beams making up the sum beam have been assigned the reference numerals 78 and 80. The difference beam 82, which is indicative of the signal traversing the difference channel 34, is better referred to as comprising portions 84 and 86, thereby forming a null point in between, which is produced by the notch 66.

From the foregoing, it will be seen that the notch 66 is formed by subtracting the gain of the beam 80 from the gain of the beam 78. When a target is present, a sufficient video signal is generated by the receiver to show up on the indicator 38, otherwise not. However, this voltage signal, though insufficient to appear in the radar display, is of sufficient amplitude so as to be picked up by the control amplifier 40 and amplified, the amplified signal thus providing the necessary voltage to operate the power divider 18 in a manner already described. Through the agency of a narrow band pass filter, the amplifier 40 will discriminate between clutter and targets; otherwise, the system would tend to place the notch directly on targets, such as the plane 58, and thereby reduce their return. Since the expected control voltage developed by the amplifier 40 is of a monotonically increasing value, the required bandwidth of this amplifier can be considerably narrower than that of the receiver 36. As a matter of fact, the bandwidth must be quite narrow in order to prevent the control amplifier from responding to the short echo from an elevated target. Otherwise the notch would move up to the target and cancel the desired signal.

Not only does the marginal amount of clutter, represented by the curve 72, left in the channel 34 and hence in the output from the receiver 36 provide the control signal for the amplifier 40, but it also provides a reference signal so that a Doppler filter can be employed in combination with the clutter trap. In this way surfaced and extremely low flying targets will not be wiped out by the clutter trap constituting my suppression system and can be boosted by non-coherent Doppler techniques (MTI). Furthermore the described system has the inherent capability of adjusting its efforts to the particular conditions that are encountered. If clutter is strong, it will be tracked by the notch 66 with greater precision; on the other hand, if the clutter gets weaker, the system turns negligent and will lag the clutter. Consequently surfaced and low flying targets will ride up on the lower side of the upper beam.

The foregoing system has dealt with the processing of returned signals in the R.F. range. Also, the processing can be accomplished at the I.F. level. Even so, R.F. and I.F. control requires both amplitude, as well as phase adjustment. This has the effect of introducing certain practical problems. On the other hand, processing the signals at the video level eliminates the phase problem, and results in effective clutter cancellation by amplitude control alone. Accordingly, the modified system now to be described is concerned with signal processing at the more convenient video level.

Figure 4:
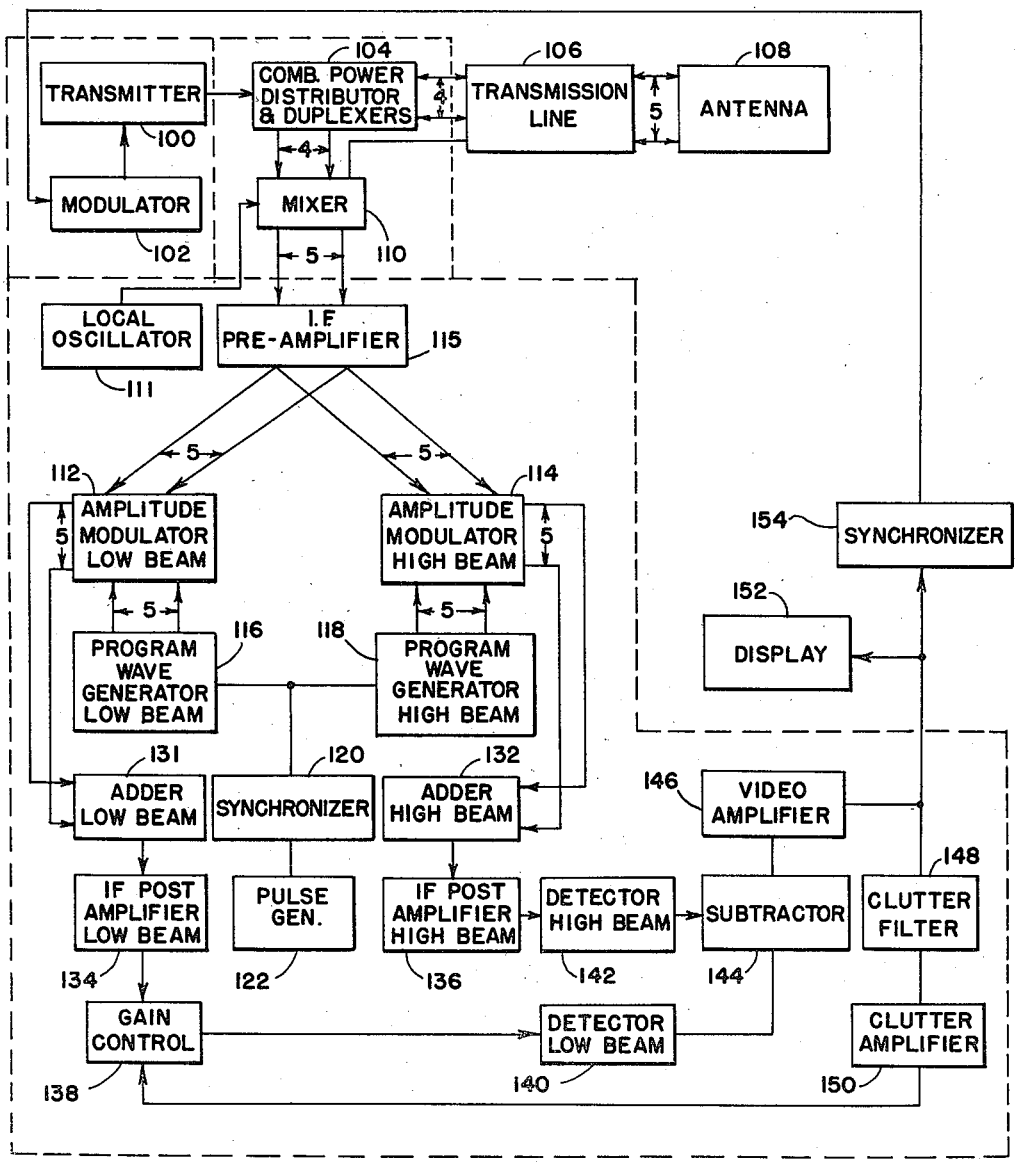
FIG. 4 is a block diagram of a system in which the signal processing takes place at the video level.

A system illustrating the use of video signals for achieving clutter suppression is set forth in block form in FIG. 4. As with the earlier described system of FIG. 1, the instant system includes a transmitter 100 which is controlled by a modulator 102. The electromagnetic radar pulses generated by the transmitter are passed through a duplexer 104 and then over a transmission line 106 to an antenna 108 corresponding in function to the antenna 20.

At this point it might be well to point out that the beamwidth and also the width of the notch that we are interested in are both determined by the antenna aperture. In order to get a narrow notch the aperture should be wide. To obtain a sufficiently wide upper beam, it is planned that this upper beam be synthesized from a number of sample beams. As will presently be made clear, provision is made for gain controlling each sample beam. The same applies to the lower beam which may have to move through several beam widths.

Having given the information appearing in the above paragraph it will now be more readily understood that the received radar signals are separated into a plurality, more specifically five, elevation channels. These channels are partly transmitted through the duplexer 104 and are partly connected directly to the various inputs of a mixer 110 receiving C.W. power from a local oscillator 111. For the purpose of avoiding further addition of noise in two IF amplitude modulators 112 and 114, an IF pre-amplifier 115 is employed.

The modulator 112 amplitude controls the five elevation channels to form the low beam, whereas the modulator 114 functions in a similar manner to form the high beam. However, each sample beam making up the low beam and each sample beam constituting the high beam must be gain controlled in a prescribed fashion. To do this, a pair of program generators 116 and 118 are utilized, the generator 116 being associated with the modulator 112 and the generator 118 with the modulator 114. A synchronizing circuit 120 assures that these generators 116, 118 and the pulse modulator 102 operate in unison, a pulse generator 122 acting to trigger the synchronizing circuit at definite intervals. In general, these intervals consist of the echo time over the maximum range of the radar, which could exceed the range of the horizon, and an allowance for the return to the condition, the fly-back time.

Figure 5:
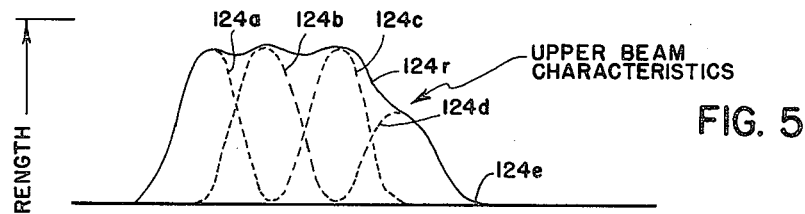
FIG. 5 is presented as an aid to understanding FIG. 4 and illustrates the upper beam as the envelope of the sample beams with signal strength being plotted against depression angle and with one sample beam being of substantially zero strength.
Figure 6:
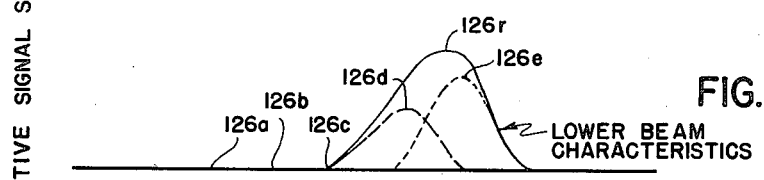
FIG. 6 illustrates the lower beam as the envelope of the sample beams similarly plotted but with three sample beams being of substantial zero strength.
Figure 7:
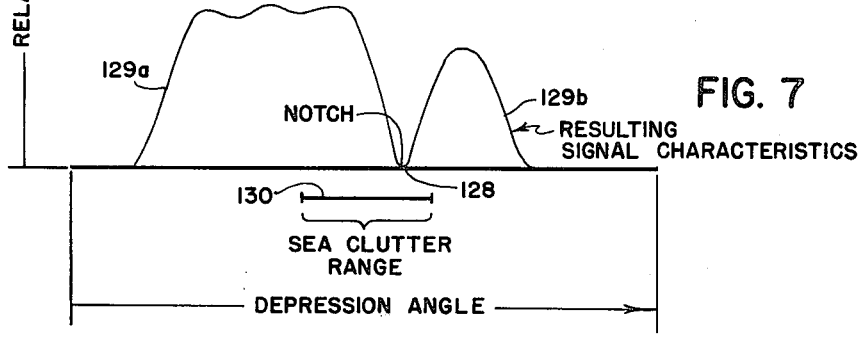
FIG. 7 illustrates the relative signal strength of the over-all system plotted as in FIGS. 6 and 7 but with the derived notch being depicted somewhat above its lowest position.

At this point it might be well to examine once again the two lobes 62 and 64 of FIG. 2 and the resulting notch therebetween. It will be recalled that the notch 66 is shifted upwardly by decreasing the attenuation of the energy received by the beam associated with the lobe 64, thereby causing a progressive domination of this beam over the beam associated with the lobe 62. As depicted in FIG. 5, it can be seen that we have now a plurality of possible beam characteristics capable of occurring at various angles of depression as indicated by the reference numerals 124a, 124b, 124c, 124d, and 124e, one for each of the five channels in the synthesized upper beam. The resulting envelope has been denoted by the character 124r. Also, in FIG. 6 there is a plurality of beam characteristics capable of occurring at 126a, 126b, 126c, 126d, and 126e, there being one for each of the five channels composing the lower beam. In this instance the resulting envelope has been labelled 126r. In FIG. 7 the derived notch 128 has been presented, the notch appearing between envelopes 129a and 129b representative of the relative signal strength of the over-all system. The program generators 116 and 118 selectively control the magnitude of the individual characteristics 124a, b, c, d, e and the characteristics 126a, b, c, d, e in a manner such that the net effect of the characteristics is to move the notch 128 upwardly, i.e., in the same direction the notch 66 of FIG. 2 moves. It will be apparent from FIG. 7 that the sea clutter range has been indicated by the depression angle bearing the numeral 130, it being remembered that this curve, as are those of FIGS. 5 and 6, are plotted with relative signal strength as the ordinate and depression angle as the abscissa. Also, it will be discerned from an inspection of FIG. 7 that the notch 128 has moved upwardly somewhat from its lowermost position, the lowermost notch position being at the extreme right of the line 130. Such a position of the notch 128 accounts for the characteristic 124e in FIG. 5 being substantially zero, and the characteristics 126a, 126b and 126c in FIG. 6 also being zero. To move the notch 128 farther up, that is to decrease the angle of depression, the characteristics 126c, 126b, 126a will be progressively built up, whereas the characteristics 124d, 124c, 124b, 124a will be progressively decreased in magnitude.

Through the agency of a low beam adder 131 and a high beam adder 132, lower and high pencil beams are formed to produce the ultimate beam characteristics alluded to above. The resulting signals from the adders 131 and 132, there now being but a single signal from each adder, are amplified by a pair of IF post amplifiers 134 and 136. The output from the amplifier 134 is fed to a gain control circuit 138 and then to a low beam detector 140. The output from the amplifier 136 in the illustrative instance is fed directly to a detector 142.

The video signals thus provided by the two detectors 140 and 142 are then delivered to a subtractor 144. The difference video signal, that is the resulting signal derived from the two detected signals coming from the subtractor 144 and containing all target echoes plus a clutter residue is amplified in a video amplifier 146. By properly adjusting the program generators 116 and 118, the sea clutter can be made so that it is always somewhat weaker in the lower beam.

The synthesized lower and upper beams change during the range sweep so that the resulting position of the notch 128 lags slightly in order to avoid bipolar errors. Therefore, a feed-back voltage derived from the clutter residue can be used for controlling the gain of the lower beam in order to minimize the clutter residue. Consequently, through the agency of the gain control 138, full cancellation of sea clutter can be achieved by increasing the gain to the proper extent in the lower beam channel. This is done automatically by the clutter residue which is filtered out of the video signal from the amplifier 146 by means of a clutter filter 148. The filtered signal is then amplified by what will be termed a clutter amplifier 150 and the amplified signal is impressed on the gain control circuit 138, thereby increasing the gain. The signal forwarded to the detector 140, owing to its increased gain, effects full cancellation of the clutter via the subtraction process performed by the subtractor 144.

A conventional radar display 152 is connected to the video amplifier 146 and so receives a clutter-free signal from said amplifier by reason of the foregoing subtractive action taking place within the subtractor 144.

The detailed description of the operation may be summarized by saying that during each radar pulse cycle an upper and lower beam are synthesized from a number of sample beams, as illustrated in FIGURES 5–7, whereby properly designed periodical waveforms are used to fade out or fade in individual sample beams so that the width of the upper beam progressively shrinks while that of the lower beam expands. The program for the processing of these beams is adjusted in such a way that the sea clutter echo rides approximately half-way up on the lower slope of the upper beam (see characteristic 124r of FIGURE 5) and in a similar position on the upper slope of the lower beam (see characteristic 126r of FIGURE 6). Since the subtraction of the received clutter signals from these two beams would not result in a complete cancellation of the clutter due to certain errors in the operation, an automatic gain control of the lower beam signal is performed in a feed-back arrangement which minimizes the clutter echo.

It is not believed necessary to set forth a separate and distinct operational description of what transpires in the functioning of the system of FIG. 4, for fairly complete operational information has been given as the description thereof progressed.

However, it may be of some assistance to list certain basic data of typical airborne radar equipment constructed in accordance with the teachings of FIG. 4:

Wavelength: 10 cm.
Antenna aperture: 23 x 23 feet
Horizontal beam width: 1 degree
Vertical pattern: 5 stacked beams adjusted for sweeping beam and clutter trap operation
Scan rate: 10 r.p.m.
Pulse repetition rate: 500 p.p.s.
Pulse duration: 1 microsecond
Number of hits per target: 8.33
Minimum target size: 1 square meter
Peak pulse power: 0.5 meg. watt.
Average pulse power: 0.5K watt As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statement of the scope of the invention which, as a matter of language, might be said to fall therebetween.

What is claimed:

1. An airborne radar system for suppressing clutter return from the earth's surface comprising antenna means including a parabolic reflector and a pair of radiators, one radiator being disposed horizontally at a distance slightly above the focal point and the other at a distance slightly below the focal point of said reflector, a radar transmitter, a duplexer connected to said transmitter, a hybrid T junction connected to the duplexer for providing a sum channel during transmission and a difference channel during reception, a power divider connected to the T connection having one guide line connected to one radiator and a second guide line connected to the other radiator, a receiver connected to the duplexer for receiving a signal in accordance with the difference of the reflected electromagnetic energy returned to said radiators, a display device connected to said receiver for providing a visible indication of said difference signal, and means for attenuating the energy passing through one guide line of said power divider thereby to shift the notch formed in the difference signal derived from said T junction.

2. An airborne radar system in accordance with claim 1 in which said last-mentioned means includes a control amplifier connected to the output side of said receiver and further includes a ferrite device in said one guide line of the power divider energized by said amplifier.

3. An airborne radar system for suppressing clutter return from the earth's surface comprising an antenna means including a parabolic reflector and a plurality of radiators, the radiators being disposed horizontally at a distance slightly above the focal point and at a distance slightly below the focal point of said reflector, a radar transmitter, a duplexer connected to said transmitter, means for separating the signals received via said radiators into a plurality of channels, a local oscillator, a mixer for mixing the signals in said plurality of channels to provide two groups of signals within an IF range, an amplitude modulator for each group of IF signals, a program generator for each modulator, means for synchronizing the action of said modulators, a first adder connected to the output of one modulator for forming a low pencil beam, a second adder connected to the output of the other modulator for forming a high pencil beam, means for amplifying said low beam, means for amplifying said high beam, a gain control in circuit with said low beam amplifying means, a low beam detector connected to the output side of said gain control, a high beam detector connected to said high beam amplifying means, a subtractor connected to both of said detectors for producing a difference video signal, an amplifier for amplifying said video signal, indicator means, and means for connecting said video amplifier to said gain control and to said indicating means.

4. An airborne radar system for suppressing clutter return from the earth's surface comprising means forming at least two individual beams at different elevation angles and having overlapping portions, control means for relatively attenuating the gain of said individual beams, means for subtracting the signals received via these beams to form a notch in the elevation response, and feed-back means connected between said subtracting means and said control means for causing said control means to affect the vertical position of the notch to cause said notch to follow the elevation angle of the ground clutter echo during the entire range sweep.

5. An airborne radar system for suppressing clutter return from the earth's surface comprising means providing a plurality of received signals each being separated into two elevation channels, program means for forming a lower beam from said received signals in one of said two elevation channels and for forming an upper beam from said received signals in the other of said two elevation channels, means for providing a first video signal in accordance with the energy contained in said lower beam, means for providing a second video signal in accordance with the energy contained in said upper beam, means for subtracting said video signals to produce a difference signal, and indication means responsive to said difference signal.

6. An airborne radar system in accordance with claim 5 in which said program means is adjusted so that the clutter is weaker in said lower beam, and feed-back means responsive to said difference signal for increasing the gain of said lower beam.

References Cited by the Examiner

UNITED STATES PATENTS

| | | | |
|---|---|---|---|
| 2,627,020 | 1/53 | Parnell et al. | 343—16.1 |
| 2,687,520 | 8/54 | Fox et al. | 343—16 |
| 2,789,285 | 4/57 | Ortusi et al. | 343—113 |
| 2,950,474 | 8/60 | Page | 343—7 |

CHESTER L. JUSTUS, *Primary Examiner.*

FREDERICK M. STRADER, M. A. MORRISON,
*Examiners.*